US009022666B2

(12) United States Patent
Haley et al.

(10) Patent No.: US 9,022,666 B2
(45) Date of Patent: May 5, 2015

(54) OPTICAL COMMUNICATION CONNECTORS WITH MODULES MOVABLE IN A MATING DIRECTION

(75) Inventors: Edmund Joseph Haley, Dillsburg, PA (US); Christopher Ryan Raybold, Elizabethtown, PA (US); Evan Charles Wickes, Harrisburg, PA (US); Jared Evan Rossman, Dover, PA (US)

(73) Assignee: Tyco Electronics Corporation

( * ) Notice: Subject to any disclaimer, the term of this patent is extended or adjusted under 35 U.S.C. 154(b) by 638 days.

(21) Appl. No.: 13/297,360

(22) Filed: Nov. 16, 2011

(65) Prior Publication Data

US 2013/0121645 A1    May 16, 2013

(51) Int. Cl.
*G02B 6/36* (2006.01)
*G02B 6/42* (2006.01)
*G02B 6/38* (2006.01)

(52) U.S. Cl.
CPC ............ *G02B 6/4249* (2013.01); *G02B 6/4292* (2013.01); *G02B 6/3821* (2013.01); *G02B 6/3879* (2013.01); *G02B 6/3885* (2013.01)

(58) Field of Classification Search
USPC ............................................... 385/53, 88, 89
See application file for complete search history.

(56) References Cited

U.S. PATENT DOCUMENTS

| | | |
|---|---|---|
| 5,138,679 A | 8/1992 | Edwards et al. |
| 5,667,410 A | 9/1997 | Johnston |
| 5,807,123 A | 9/1998 | Spiegehaar et al. |
| 5,865,641 A | 2/1999 | Swart et al. |
| 5,954,529 A | 9/1999 | Meller |
| 5,967,856 A | 10/1999 | Meller |
| 6,083,059 A | 7/2000 | Kuan |
| 6,085,003 A | 7/2000 | Knight |
| 6,099,322 A | 8/2000 | Beloritsky et al. |
| 6,305,848 B1 | 10/2001 | Gregory |
| 6,382,839 B1 * | 5/2002 | Eguchi et al. ................ 385/56 |
| 6,412,986 B1 | 7/2002 | Ngo et al. |
| 6,456,766 B1 | 9/2002 | Shaw et al. |
| 6,783,405 B1 | 8/2004 | Yen |

(Continued)

FOREIGN PATENT DOCUMENTS

| | | |
|---|---|---|
| EP | 1180703 A1 | 2/2002 |
| WO | 9711397 A1 | 3/1997 |

OTHER PUBLICATIONS

Tyco Electronics, "OPTIMATE Fiber Optic Lightplane Connector", Application Specification 114-45005, Rev. B, Oct. 13, 2009, 16 pgs.

(Continued)

*Primary Examiner* — Uyen Chau N Le
*Assistant Examiner* — Chad Smith

(57) ABSTRACT

An optical communication connector having a connector housing that includes opposite mating and loading sides and a housing cavity that extends therebetween. The optical communication connector also includes an optical module that is positioned within the housing cavity and a biasing element that is positioned between the optical module and the loading side in the housing cavity. The biasing element has a module end, a back end, and a resilient spring portion that extends between the module and back ends. The spring portion includes an elongated body having a plurality of flexible bend segments that wrap back-and-forth within a spring plane. The spring portion is compressible between first and second states during a mating operation between the optical module and an optical connector.

20 Claims, 10 Drawing Sheets

(56) References Cited

U.S. PATENT DOCUMENTS

| | | |
|---|---|---|
| 7,270,558 B1 | 9/2007 | Chiang |
| 7,322,834 B2 | 1/2008 | Hu et al. |
| 7,607,952 B2 | 10/2009 | Tai |
| 2002/0186931 A1 | 12/2002 | Seo et al. |
| 2004/0042741 A1* | 3/2004 | Moriyama et al. ............... 385/92 |
| 2005/0135742 A1* | 6/2005 | Basavanhally et al. ......... 385/33 |
| 2006/0078248 A1* | 4/2006 | Sasaki et al. .................... 385/14 |
| 2012/0141074 A1* | 6/2012 | Sabo ............................... 385/78 |

OTHER PUBLICATIONS

Tyco Electronics, "MULTI-BEAM XL Connectors", Application Specification 114-13038, Rev. J, Apr. 6, 2011, 15 pgs.

"Cradle Connector 12 Position and Keying", 2005.

International Search Report, International Application No. PCT/US2012/065412, International Filing Date Nov. 16, 2012.

* cited by examiner

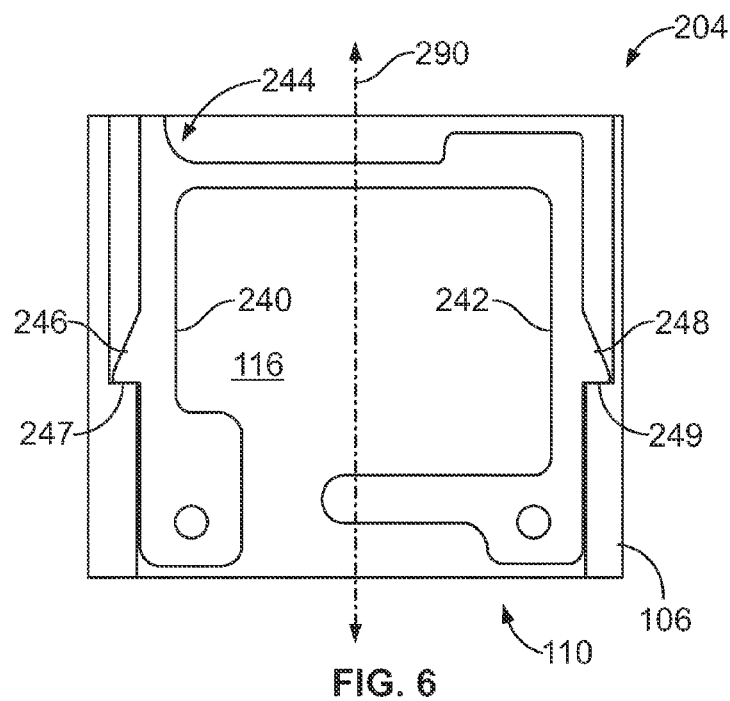
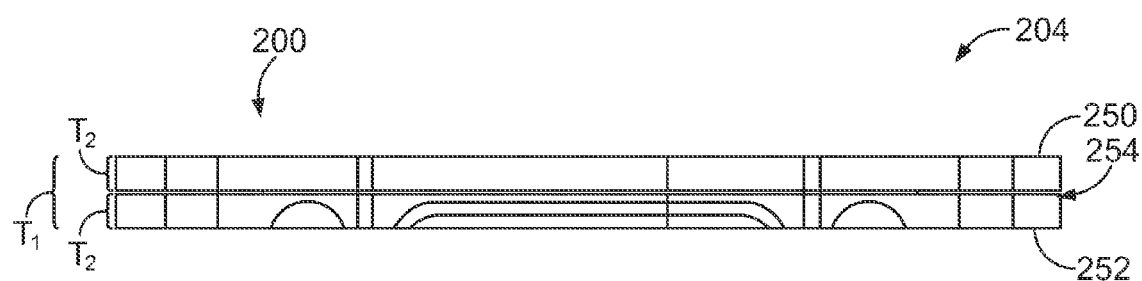

OPTICAL COMMUNICATION CONNECTORS WITH MODULES MOVABLE IN A MATING DIRECTION

BACKGROUND OF THE INVENTION

The subject matter described and/or illustrated herein relates generally to optical communication connectors with optical modules capable of moving in a mating direction when engaging another connector.

Optical communication connectors are configured to interconnect different optical fibers in a manner that maintains the transmission of light signals through the interconnection. For example, an optical communication connector may mechanically couple and align the cores of different optical fibers so that the light signals can be transmitted between the optical fibers. Optical communication connectors may include ferrules that hold the ends of the optical fibers. In some proposed connectors, the ferrules are floatable so that the ferrules can be moved during a mating operation to align the ferrules with another connector. The connectors include one or more coil springs that provide a resilient force for holding the floatable ferrules in biased positions and resisting movement of the ferrules.

However, at least some of the optical communications connectors currently used have undesirable limitations. For example, the ferrules may have dimensions that render the ferrules unsuitable for high density applications. Moreover, the connectors that use coil springs must be configured to accommodate for the size and movement of the coil springs. In particular, coil springs occupy a cylindrical space that can be unsuitable for some high density applications. Furthermore, the coil springs and other types of biasing mechanisms may only be displaced by a limited distance and/or may be unable to achieve a desired spring force that facilitates the interconnection of the optical fibers.

Accordingly, there is a need for optical communication connectors that are suitable for high density applications and/or capable of achieving the desired displacement distances or spring forces.

BRIEF DESCRIPTION OF THE INVENTION

In one embodiment, an optical communication connector is provided that has a connector housing that includes opposite mating and loading sides and a housing cavity that extends therebetween. The optical communication connector also includes an optical module that is positioned within the housing cavity and a biasing element that is positioned between the optical module and the loading side in the housing cavity. The biasing element has a module end, a back end, and a resilient spring portion that extends between the module and back ends. The spring portion includes an elongated body having a plurality of flexible bend segments that wrap back-and-forth within a spring plane. The spring portion is compressible between first and second states during a mating operation between the optical module and an optical connector.

In another embodiment, an optical communication connector is provided that includes a connector housing having opposite mating and loading sides and a mating axis that extends therebetween. The connector housing has a housing cavity. The optical communication connector also includes a plurality of optical modules that are positioned within the housing cavity. At least two of the optical modules are adjacent to each other and slidable alongside each other. The optical communication connector also includes a plurality of biasing elements that are positioned between respective optical modules and the loading side in the housing cavity. Each of the biasing elements includes a coil-less spring portion that is compressible between first and second states during a mating operation thereby permitting the optical modules to slide toward the loading side.

In yet another embodiment, an optical communication connector is provided that includes a connector housing having opposite mating and loading sides and a mating axis that extends therebetween. The connector housing has a housing cavity. The optical communication connector also includes an optical module that is positioned within the housing cavity. The optical module is movable along the mating axis. The optical communication connector also includes a biasing element that is positioned between the optical module and the loading side in the housing cavity. The biasing element includes a coil-less spring portion that is compressible between first and second states during a mating operation to permit movement of the optical module toward the loading side.

BRIEF DESCRIPTION OF THE DRAWINGS

FIG. 6 is an enlarged view of a portion of the biasing element of FIG. 4 illustrating a back end in greater detail.

FIG. 7 is an end view of the biasing element of FIG. 4.

DETAILED DESCRIPTION OF THE INVENTION

Figure 1:
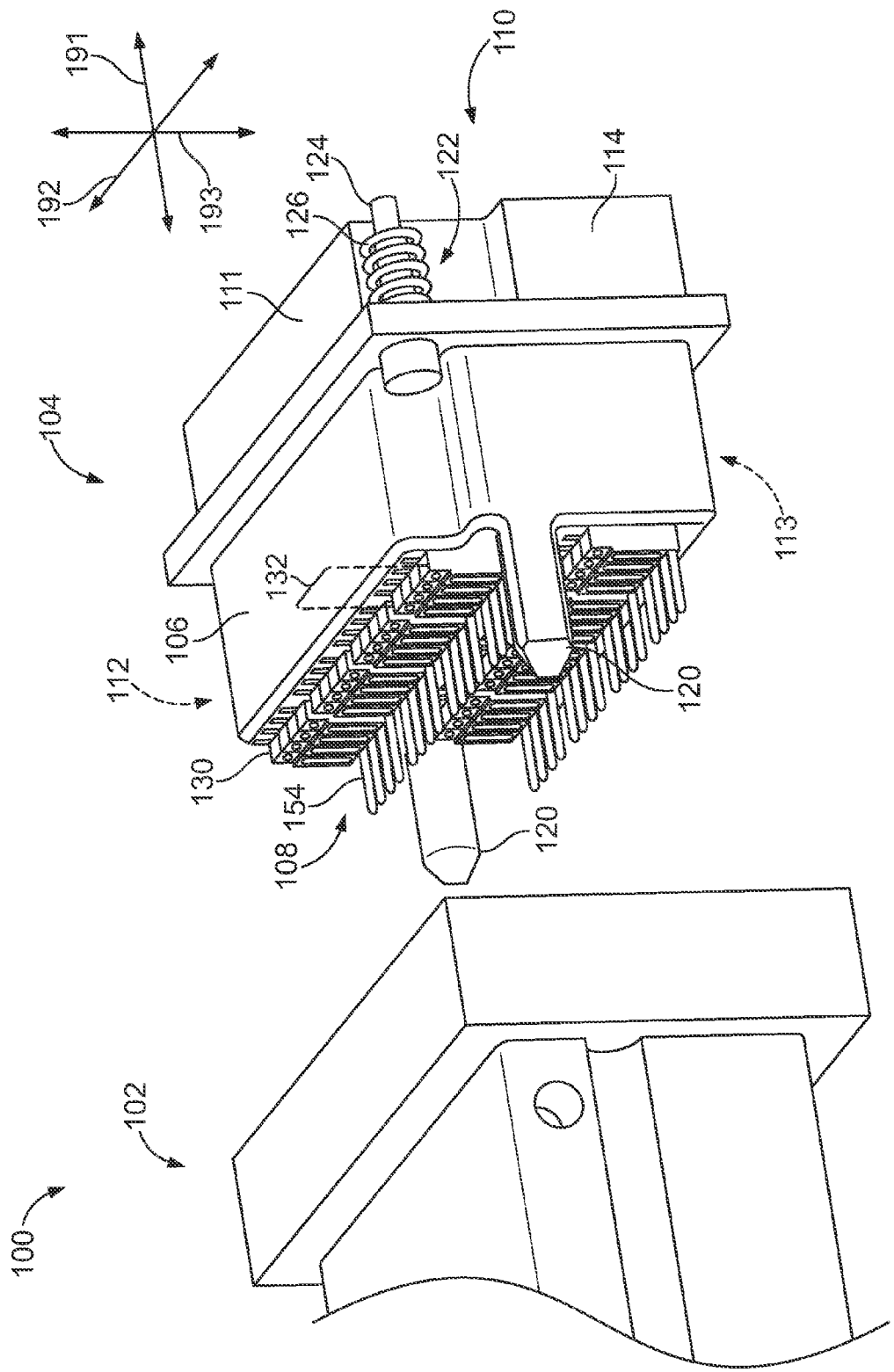
FIG. 1 is a perspective view of a communication system including an optical communication connector formed in accordance with one embodiment.

FIG. 1 is a perspective view of an optical communication system 100 formed in accordance with one embodiment. The communication system 100 includes first and second communication connectors 102, 104. The communication system 100 is oriented with respect to mutually perpendicular axes 191-193 including a mating axis 191, a lateral axis 192, and an orientation axis 193. The communication connectors 102, 104 are configured to engage each other during a mating operation and establish an optical connection therebetween. The communication connectors 102, 104 may move relatively toward each other along the mating axis 191 during the mating operation. In an exemplary embodiment, the communication connector 102 is advanced toward the communication connector 104. However, in other embodiments, the communication connector 104 can be advanced toward the communication connector 102 or both can be moved toward each other. Although not shown, the communication connector 104 in some embodiments may be mounted to a panel and the communication connector 102 may be coupled to an optical cable in some embodiments.

The communication connector 104 includes a connector housing 106 having a mating side 108 and a loading side 110 that face in opposite directions along the mating axis 191. The connector housing 106 also includes housing sides 111-114 and one or more housing cavities 116 (shown in FIG. 2). The connector housing 106 may also include one or more alignment features 120 that project away from the mating side 108 along the mating axis 191. In an exemplary embodiment, the communication connector 104 includes a floating device 122 having a post 124 and a coil spring 126. The floating device 122 may hold the connector housing 106 in a predetermined position and permit the connector housing 106 to move along the mating axis 191 when the communication connector 102 engages the communication connector 104.

Figure 4:
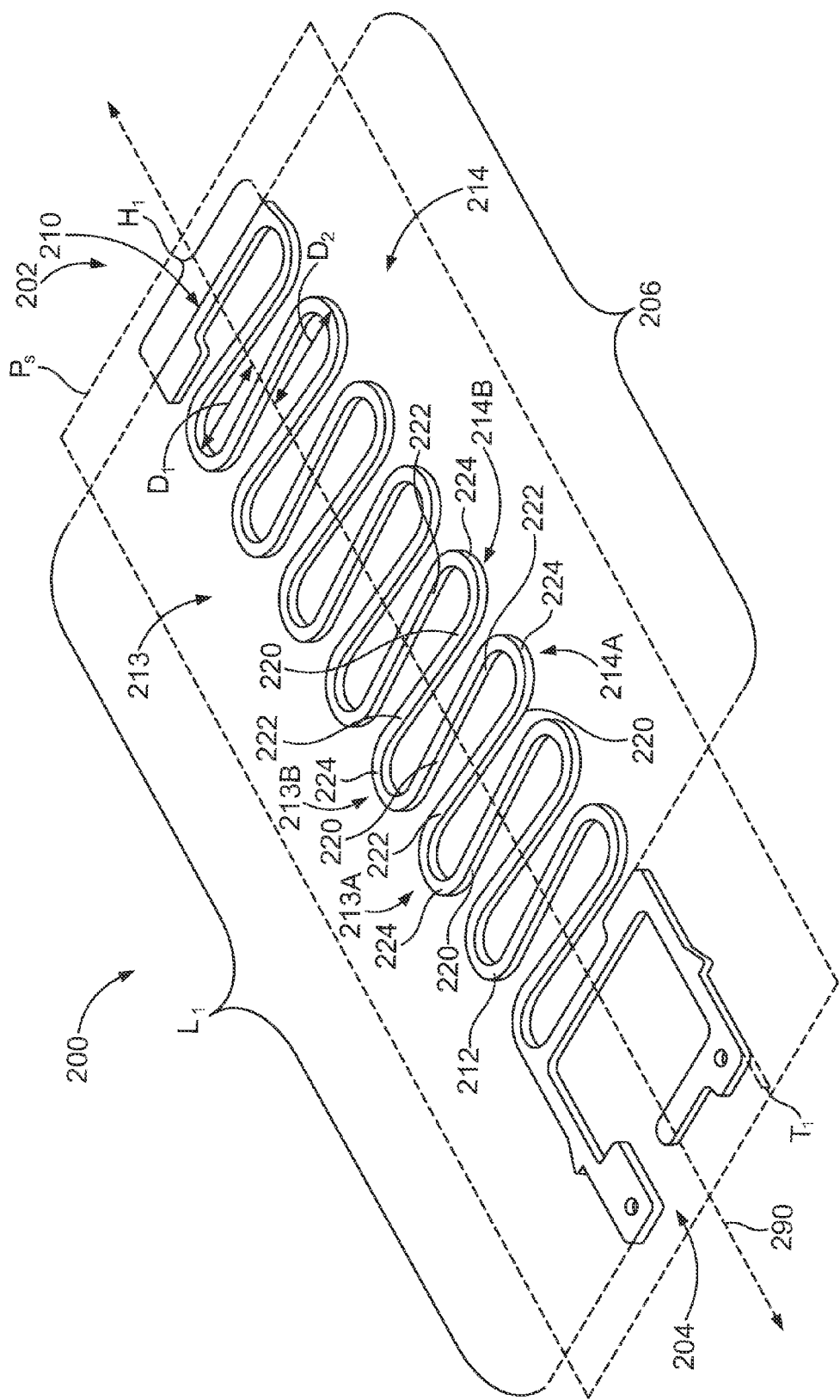
FIG. 4 is a perspective view of a biasing element that may be used with the communication connector of FIG. 1.

The communication connector 104 also includes a plurality of optical modules 130 that are positioned within respective housing cavities 116. The optical modules 130 can be proximate to the mating side 108. For example, the optical modules 130 may project beyond the mating side 108, may be located at the mating side 108, or may be located a small depth within the housing cavity 116. The optical modules 130 are configured to receive and transmit optical signals therethrough. In some embodiments, the optical modules 130 include alignment pins 154 that project away from the mating side 108. As will be described in greater detail below, the optical modules 130 are held in biased positions by biasing elements 200 (FIG. 4). The biasing elements 200 permit the optical modules 130 to be moved relative to the connector housing 106. More specifically, the biasing elements 200 permit the optical modules 130 to move into the respective housing cavity 116 during the mating operation.

In an exemplary embodiment, the optical modules 130 are arranged in sets 132 in which the optical modules 130 are stacked side-by-side in each set 132. For example, each of the eight sets 132 shown in FIG. 1 includes four optical modules 130. However, each set 132 may include fewer than four (e.g., only two) or more than four optical modules 130. Furthermore, although the communication connector 104 includes numerous sets 132 and optical modules 130 in the illustrated embodiment, other embodiments of the communication connector 104 may include only one set 132 or only one optical module 130.

Figure 2:
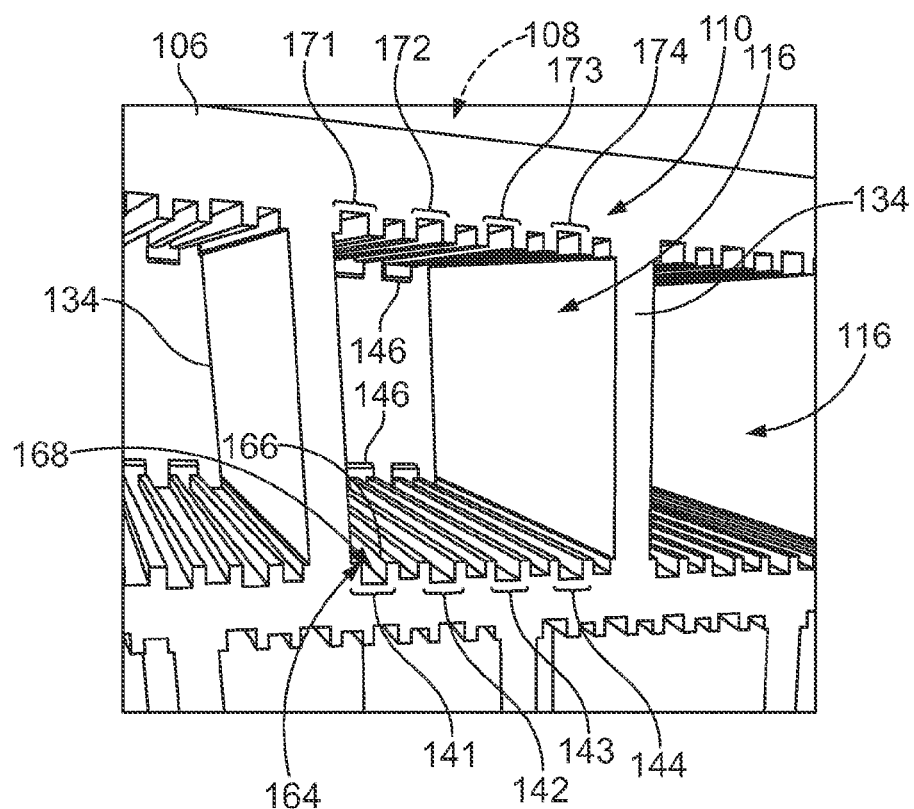
FIG. 2 is an isolated view of a loading side of a connector housing that may be used with the communication connector of FIG. 1.

FIG. 2 is an isolated perspective view of a portion of the loading side 110 of the connector housing 106. In the illustrated embodiment, the connector housing 106 is a single continuous part molded from a dielectric material. However, in other embodiments, the connector housing 106 may be constructed from multiple parts, constructed using different processes, and/or manufactured from different materials.

In an exemplary embodiment, the connector housing 106 includes a plurality of housing cavities 116. Each of the housing cavities 116 may be configured to hold one of the sets 132 (FIG. 1) of the optical modules 130 (FIG. 1). As shown, each of the housing cavities 116 may be accessible through the mating side 108 and also the loading side 110 such that the housing cavity 116 opens to the mating side 108 and also to the loading side 110. In other embodiments, the housing cavity 116 may be accessed through only the mating side 108. In alternative embodiments, the housing cavity 116 may be accessed through at least one of the housing sides 111-114.

As shown in FIG. 2, the connector housing 106 includes a plurality of housing walls 134. Adjacent housing walls 134 may have one of the housing cavities 116 therebetween. For example, interior surfaces of the housing walls 134 may define the housing cavities 116. The housing cavities 116 may include guide channels 141-144 and 171-174 that extend between the mating and loading sides 108, 110. With reference to only the guide channel 141, each of the guide channels 141-144, 171-174 may include guide walls 164, 166 and a slot 168 therebetween. In an exemplary embodiment, opposing guide channels (e.g., the guide channels 141 and 171) are configured to have one optical module 130 and one biasing element 200 therebetween. The biasing element 200 may fit within the slots 168. The connector housing 106 can also include positive stops 146 that can be located proximate to the mating side 108. In other embodiments, positive stops may be located proximate to the loading side 110 or within the connector housing 106.

Figure 3:
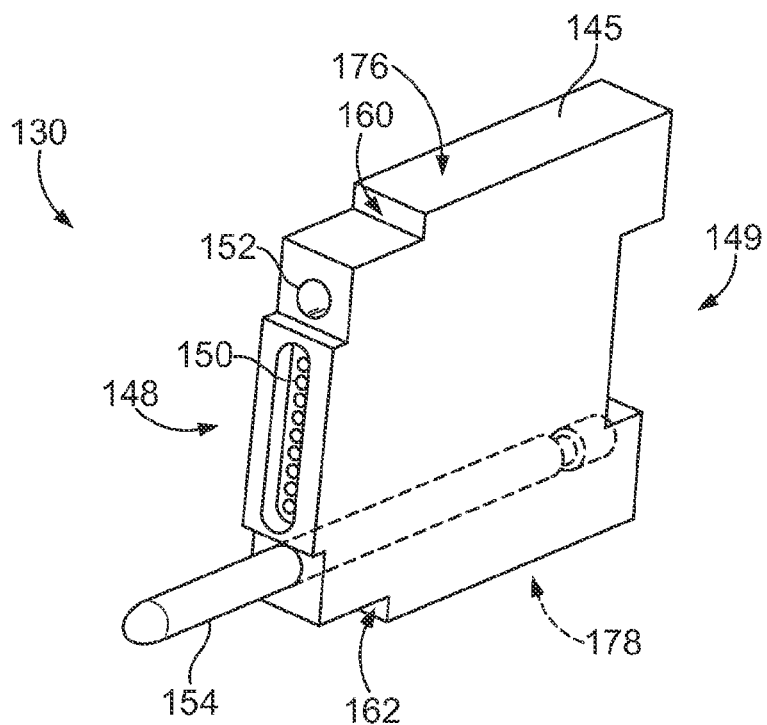
FIG. 3 is a perspective view of an optical module that may be used with the communication connector of FIG. 1.

FIG. 3 is an isolated perspective view of the optical module 130 in an exemplary embodiment. The optical module 130 has a module housing 145 with mating and loading faces 148, 149. The mating face 148 is configured to engage the communication connector 102 (FIG. 1). In the illustrated embodiment, the mating face 148 includes a plurality of apertures 150 that are configured to receive a corresponding optical fiber from the communication connector 102. Alternatively, optical fibers may project from the apertures 150 away from the mating face 148. During operation of the communication system 100 (FIG. 1), optical signals may be transmitted into the optical module 130 through the apertures 150. The loading face 149 may be configured to engage the biasing element 200 (FIG. 4).

Also shown, the optical modules 130 may include the alignment pin 154 and an alignment bore 152. The alignment bore 152 is configured to receive an alignment pin (not shown) from the communication connector 102 that can be similar to the alignment pin 154. In the illustrated embodiment, the optical module 130 includes one alignment bore 152 and one alignment pin 154. In alternative embodiments, the optical module 130 can include only alignment bore(s) 152 or only alignment pin(s) 154.

The optical modules 130 may be configured to slide along corresponding guide channels 141-144, 171-174 (FIG. 2) and, in some embodiments, be pressed against the connector housing 106 (FIG. 1). For example, the module housing 145 can include housing surfaces 176, 178 and the mating face 148 can include forward-facing surfaces 160, 162. By way of one example, the housing surfaces 176, 178 may be configured to slide along the guide channels 171, 141 (FIG. 2), respectively. The forward-facing surfaces 160, 162 face in a direction along the mating axis 191 (FIG. 1). When the biasing element 200 is engaged with the loading face 149 of the optical module 130, the forward-facing surfaces 160, 162 may engage the connector housing 106. For example, the forward-facing surfaces 160, 162 can engage respective positive stops 146 (FIG. 2).

FIG. 4 is an isolated view of the biasing element 200. The biasing element 200 has a module end 202, a back end 204, and a resilient spring portion 206 that extends between the module and back ends 202, 204. The biasing element 200 is configured to be inserted into a corresponding housing cavity 116 (FIG. 1) and engage a corresponding optical module 130

(FIG. 1). In an exemplary embodiment, the spring portion 206 includes a coil-less spring that allows the biasing element 200 to be compressed between first and second states. As shown, the biasing element 200 has a length $L_1$, a thickness $T_1$, and a height $H_1$. The length $L_1$ can be the longest dimension and the height $H_1$ is greater than the thickness $T_1$. For example, a ratio between the height $H_1$ and the thickness $T_1$ may be greater than about 5:1 or about 8:1. In particular embodiments, the ratio between the height $H_1$ and the thickness $T_1$ may be greater than about 10:1. When oriented in the housing cavity 116, the length $L_1$ extends along the mating axis 191 (FIG. 1), the thickness $T_1$ extends along the lateral axis 192 (FIG. 1), and the height $H_1$ extends along the orientation axis 193 (FIG. 1).

The module end 202 is configured to engage the optical module 130. In the illustrated embodiment, the module end 202 includes an engagement surface 210 that is configured to abut and press against the optical module 130 without coupling the optical module 130 and the biasing element 200. However, in other embodiments, the module end 202 may directly couple to the optical module 130. For example, the biasing elements 300, 310, and 320 of FIGS. 9, 10, and 11, respectively, show embodiments that couple to the corresponding optical modules. The back end 204 may be configured to engage a surface of the connector housing 106 (FIG. 1).

The spring portion 206 includes an elongated body 212 having a plurality of flexible bend segments 213, 214. The spring portion 206 may be a coil-less spring. For example, the bend segments 213, 214 may wrap back-and-forth within a spring plane $P_{S1}$. The bend segments 213, 214 may intersect (e.g., lie within) the spring plane $P_{S1}$ for an entire path of the corresponding bend segment. In particular embodiments, the entire path of the elongated body 212 extends within the spring plane $P_{S1}$. As shown, the elongated body 212 includes seven bend segments 213 and seven bend segments 214. However, the elongated body 212 can include fewer bend segments 213, 214 in other embodiments, such as only one bend segment 213 and only one bend segment 214. In other embodiments, the elongated body 212 can include more bend segments 213, 214 than those shown in FIG. 4. In particular embodiments, the spring portion 206 includes at least three bend segments (e.g., two bend segments 213 and one bend segment 214) and, more particularly, at least four bend segments.

As shown in FIG. 4, the spring portion 206 extends between the module and back ends 202, 204 along a central longitudinal axis 290. The longitudinal axis 290 extends substantially parallel to the mating axis 191 (FIG. 1). The longitudinal axis 290 can coincide with the spring plane $P_{S1}$. In an exemplary embodiment, the module and the back ends 202, 204 also lie within the spring plane $P_{S1}$ as shown in FIG. 4. However, in other embodiments, the module and the back ends 202, 204 may not lie within the spring plane $P_{S1}$ or only a portion of the module and the back ends 202, 204 lie within the spring plane $P_{S1}$.

The elongated body 212 may have a path in which portions of the path extend substantially transverse to the longitudinal axis 290 and other portions extend substantially parallel to the longitudinal axis 290. In particular embodiments, the path may be wave-like or serpentine-like between the module and the back ends 202, 204. The path may cross the longitudinal axis 290 a plurality of times (e.g., at least four times).

For illustrative purposes, only adjacent bend segments 213A, 213B and adjacent bend segments 214A, 214B are specifically referenced in FIG. 4, but the other bend segments 213, 214 may have similar features. As shown, each of the bend segments 213A-B and 214A-B includes a pair of arms 220, 222 and a linking portion 224 that joins the pair of arms 220, 222. The arms 220, 222 extend substantially transverse to the longitudinal axis 290 and join a corresponding arm of the subsequent bend segment. By way of one example, the arm 222 of the bend segment 213A extends substantially transverse to the longitudinal axis 290 and joins the arm 220 of the bend segment 214A, which also extends substantially transverse to the longitudinal axis 290.

The path of the elongated body 212 along the linking portions 224 may have a curved shaped. For example, the path of the linking portion 224 extends in one direction away from the longitudinal axis 290, curves or turns around, and then extends in another direction toward the longitudinal axis 290. The path along the bend segments 213 may be at most a distance $D_1$ away from the longitudinal axis 290, and the path along the bend segments 214 may be at most a distance $D_2$ away from the longitudinal axis 290. In an exemplary embodiment, the distances $D_1$ and $D_2$ are substantially equal. The distances $D_1$ and $D_2$ may also be referred to as amplitudes $D_1$ and $D_2$.

In FIG. 4, the bend segments 213, 214 have a sinusoidal-like waveform in which each of the bend segments 213, 214 has an identical shape. However, in alternative embodiments, the bend segments 213, 214 may have different shapes. For example, adjacent bend segments may have different amplitudes away from the longitudinal axis 290 (e.g., the bend segment 214A and the bend segment 214B may have different amplitudes $D_2$). In other embodiments, the path of the bend segments 213, 214 may curve at another location in addition to the linking portion 224.

In the illustrated embodiment, the biasing element 200 is stamped from a sheet of resilient material. In other embodiments, the biasing element 200 can be molded or machined from a resilient material. Although the entire biasing element 200 is stamped from sheet material in the illustrated embodiment, other embodiments may include the spring portion 206 being stamped from a sheet of material, but the module end 202 and/or the back end 204 being manufactured by other processes. In such embodiments, the spring portion 206 can be coupled to the module end 202 and/or the back end 204 to construct the biasing element 200.

Figure 5:
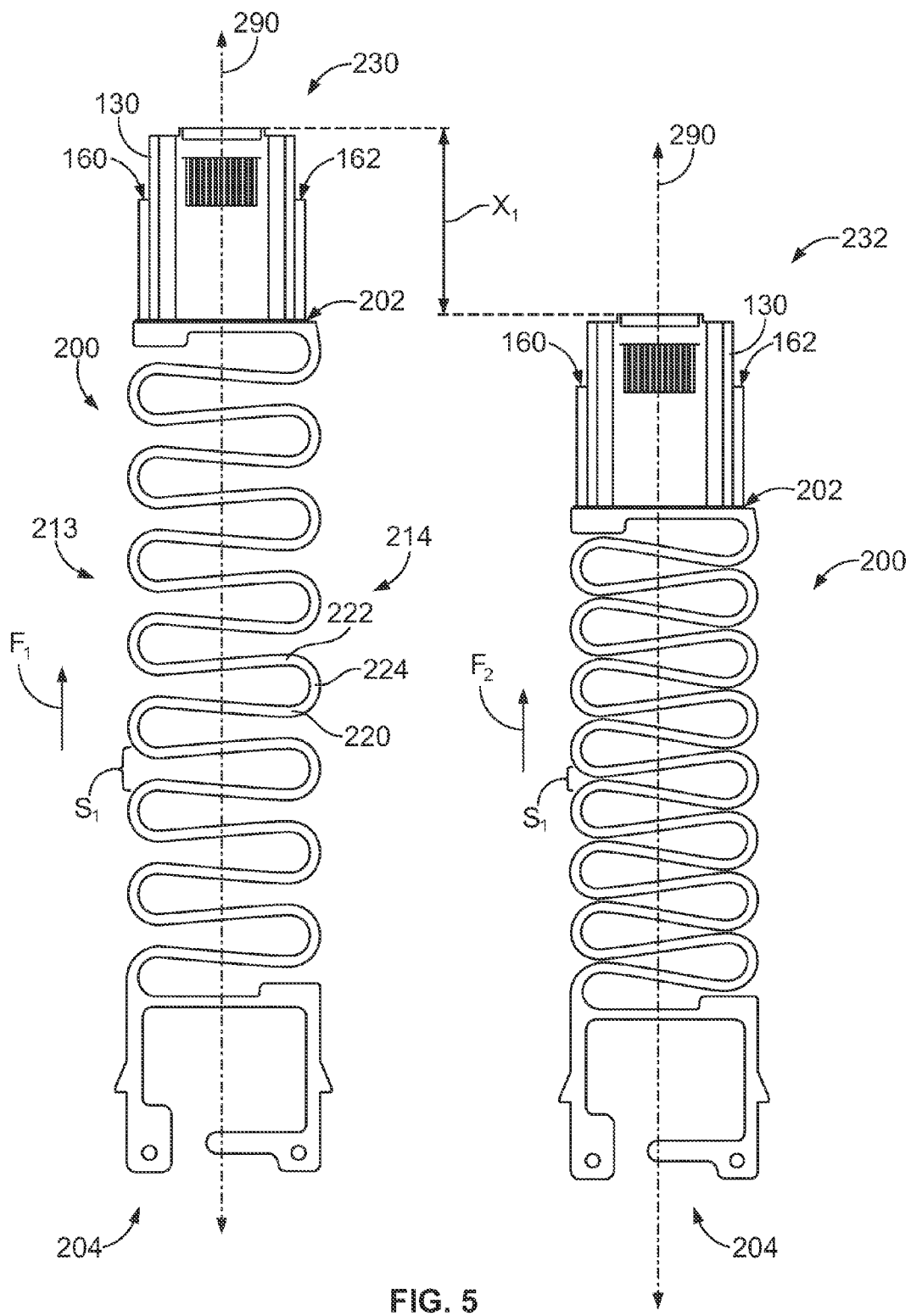
FIG. 5 illustrates the biasing element of FIG. 4 in different first and second states and engaged with the optical module.

FIG. 5 is a plan view of the biasing element 200 engaged with the optical module 130 in a first state 230 and in a second state 232. The biasing element 200 is configured to be positioned between a corresponding optical module 130 and the loading side 110 (FIG. 1) in a corresponding housing cavity 116 (FIG. 2). In an exemplary embodiment, the back end 204 remains in a static position relative to the loading side 110 and the module end 202 is permitted to move relative to the mating side 108 (FIG. 1). The spring portion 206 is configured to be compressed from the first state 230 to the second state 232 during the mating operation between the optical module 130 and the communication connector 102 (FIG. 2). Compressing the spring portion 206 reduces the length $L_1$ (FIG. 4) of the biasing element 200 and brings the optical module 130 closer to the back end 204.

In the first state 230, the spring portion 206 may be substantially relaxed (e.g., partially compressed or without any compression) and/or provide a resilient force $F_1$ in a direction along the longitudinal axis 290 toward the mating side 108. The resilient force $F_1$ is greater than zero in the exemplary embodiment and facilitates holding the optical module 130 in a predetermined biased position against the connector housing 106 (FIG. 1). However, the resilient force $F_1$ can be approximately zero. In the first state, the forward-facing surfaces 160, 162 are engaged to the connector housing 106.

Figure 13:
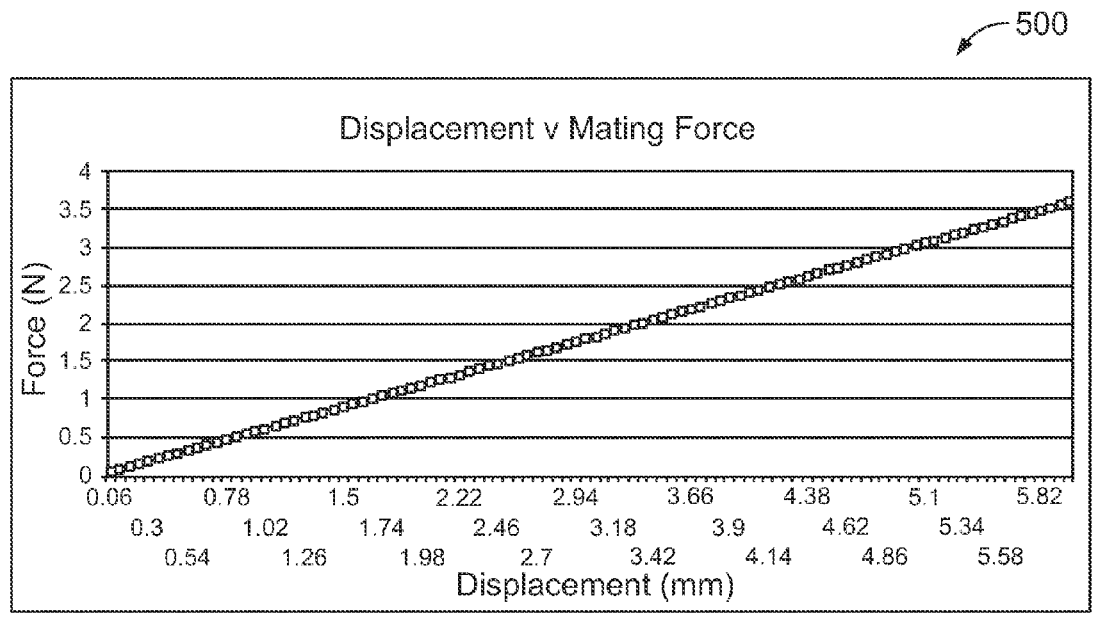
FIG. 13 illustrates a relationship between a resilient force and a displaced distance of the biasing element in accordance with one embodiment.

In the second state 232 shown in FIG. 5, the biasing element 200 is compressed and provides a resilient force $F_2$ along the longitudinal axis 290 toward the mating side 108. The resilient force $F_2$ is greater than the resilient force $F_1$. The optical module 130 in the second state 232 has been displaced along the longitudinal axis 290 by a displaced distance $X_1$. The resilient force $F_2$ may be based upon the displaced distance $X_1$. For instance, as the displaced distance $X_1$ increases, the resilient force $F_2$ may also increase. In particular embodiments, the resilient force $F_2$ and the displaced distance $X_1$ may have a linear relationship as shown in the graph 500 in FIG. 13.

By way of one example only, the optical module 130 is configured to be moved between 0 to at least about 2.0 mm along the mating axis 191 (i.e., the displaced distance $X_1$ is at least about 2.0 mm) during the mating operation. In more particular embodiments, the displaced distance $X_1$ is at least about 3.0 mm. In the above embodiments, the biasing element 200 may be partially compressed before the mating operation. For example, the biasing element 200 may already be displaced up to about 3.0 mm before the mating operation. Accordingly, in some embodiments, an entire displacement from a relaxed state to a fully compressed state is about 6.0 mm.

As shown in FIG. 5, the paths of the bend segments 213 and 214 may curve more than 180° through the corresponding linking portions 224. The adjacent arms 220, 222 of one bend segment 213 or 214 may extend away from each other as the adjacent arms 220, 222 extend away from the longitudinal axis 290 (or closer to each other as the adjacent arms 220, 222 extend toward the longitudinal axis 290). However, in other embodiments, the linking portions 224 do not curve more than 180°.

During the mating operation, the resilient force F presses the optical module 130 in a direction toward the mating side 108. When the spring portion 206 is compressed from the first state 230 to the second state 232, the optical module 130 slides along the connector housing 106 toward the loading side 110. As shown in FIG. 5, a separation distance or spacing $S_1$ that separates adjacent bend segments 213 may reduce in size from the first state 230 to the second state 232. In some embodiments, the spacing $S_1$ may reduce to zero such that the adjacent bend segments 213 contact each other and the adjacent bend segments 214 contact each other in the second state 232. When the spacing $S_1$ is zero, the spring portion 206 cannot be compressed any further. Accordingly, in some embodiments, the bend segments 213, 214 may be configured to effectively stop the optical module 130 from moving any further along the longitudinal axis 290. In other embodiments, adjacent bend segments 213 or 214 do not engage each other in the second state 232.

FIG. 6 illustrates the back end 204 in greater detail when the biasing element 200 (FIG. 4) is in the housing cavity 116. In some embodiments, the back end 204 is configured to releasably engage the connector housing 106 proximate to the loading side 110. For example, the back end 204 may include first and second legs 240, 242. In an exemplary embodiment, the first and second legs 240, 242 are coupled together at an end joint 244. The first and second legs 240, 242 may include respective projections 246, 248. The projections 246, 248 may engage corresponding surfaces 247, 249 of the connector housing 106 when the biasing element 200 (FIG. 4) is held within the housing cavity 116.

In an exemplary embodiment, at least one of the first and second legs 240, 242 is configured to move with respect to the connector housing 106 to release the biasing element 200. The second leg 242 may be configured to flex with respect to the connector housing 106 and move toward the longitudinal axis 290 (or in a direction that is transverse to the longitudinal axis 290). When the second leg 242 is moved toward the longitudinal axis 290, the projection 248 moves away from the corresponding surface 249 of the connector housing 106 thereby releasing the biasing element 200. The biasing element 200 may then be removed from the housing cavity 116.

FIG. 7 is an end view of the back end 204 of the biasing element 200. In some embodiments, the biasing element 200 includes a plurality of biasing components 250, 252 that are stacked side-by-side and coupled together along an element interface 254. Stacked biasing components may effectively increase a resilient force of the biasing element. For example, each of the biasing components 250, 252 may be stamped from sheet material and have a thickness $T_2$. When the biasing components 250, 252 are stacked and coupled to each other, the stacked biasing components 250, 252 have a combined thickness that can be equal to the thickness $T_1$. In an exemplary embodiment, the biasing components 250, 252 are identically shaped having the same shape of the biasing element 200 as shown in FIGS. 4 and 5. The biasing components 250, 252 may be coupled to each other through a welding process. Accordingly, the stacked biasing components 250, 252 are configured to move with each other between the first and second states 230, 232 (FIG. 5). However, in alternative embodiments, the biasing element 200 does not have stacked biasing components.

Figure 8:
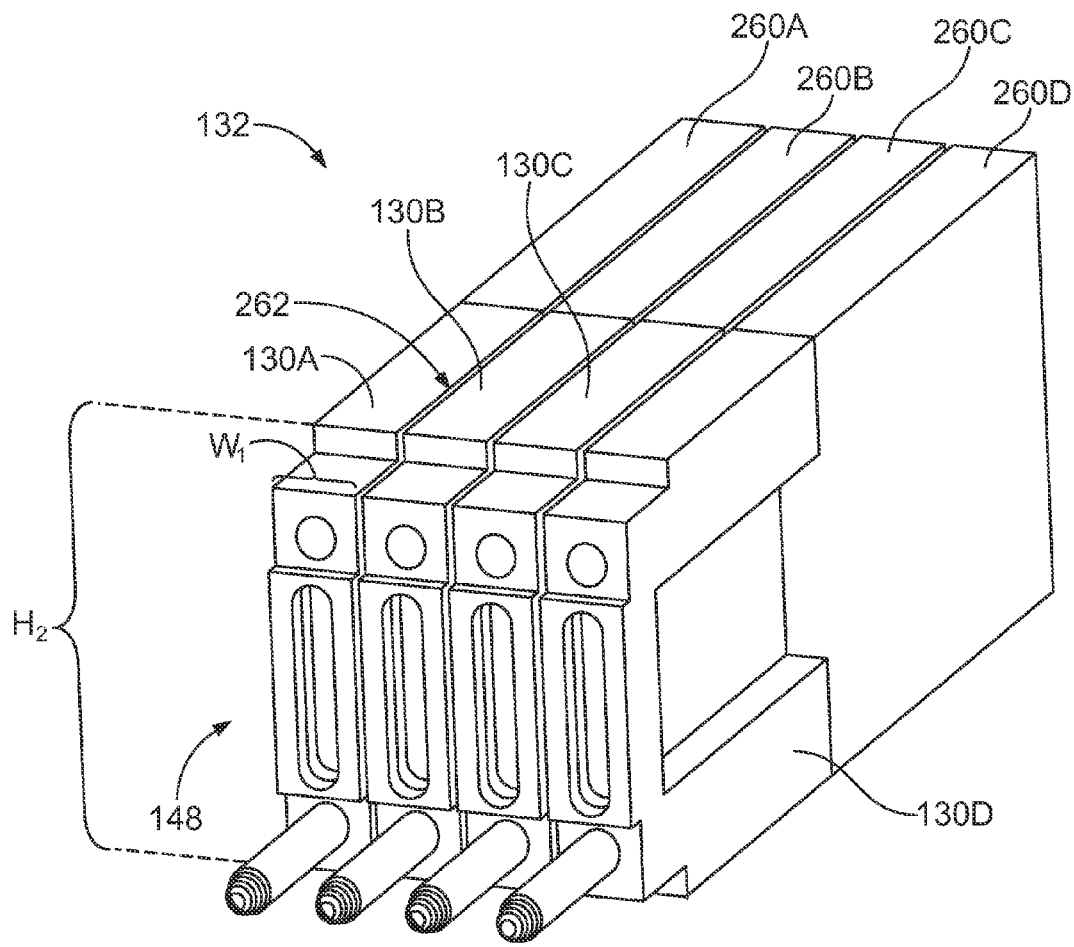
FIG. 8 is a perspective view of one set of optical modules that may be used in the communication connector of FIG. 1.

FIG. 8 is a perspective view of one set 132 of optical modules 130A-D. In an exemplary embodiment, the optical modules 130A-D of each set 132 are stacked adjacent to one another. For example, adjacent optical modules 130A and 130B may extend alongside each other with a module interface 262 therebetween and can be configured to move independently alongside each other. The optical modules 130A-D extend in a direction along the mating axis 191 (FIG. 1). In some embodiments, the module interface 262 may include a thin space between the adjacent optical modules 130A, 130B. In other embodiments, the module interface 262 may include the optical modules 130A, 130B being in direct contact with each other. In such cases, the optical modules 130A, 130B must overcome a static frictional force for the optical modules 130A, 130B to move alongside each other.

Each of the optical modules 130A-D and the respective biasing element 200 (FIG. 4) are located within a corresponding operational envelope 260A-D of the respective housing cavity 116 (FIG. 2). The operational envelopes 260A-D may be regions of the housing cavity 116. Each of the optical modules 130A-D is independently movable within the corresponding operational envelope 260A-D when the respective biasing element 200 is compressed between first and second states 230, 232 (FIG. 5). For example, if the communication connector 102 (FIG. 1) engages the optical module 130A before engaging the optical module 130B, the optical module 130A and the respective biasing element 200 may move within the operational envelope 260A before the optical module 130B and the respective biasing element 200 move within the operational envelope 260B. In some embodiments, each of the respective biasing elements 200 moves along the corresponding operational envelope 260A-D without intersecting the other operational envelope. For example, the biasing element 200 engaged with the optical module 130B may move and remain within the operational envelope 260B without intersecting the adjacent operational envelopes 260A and 260C. As such, the biasing elements 200 may avoid inadvertently interfering with each other during the mating operation.

As shown, the mating faces 148 of the optical modules 130 have a first dimension or height $H_2$ and a second dimension or width $W_1$. The first and second dimensions $H_2$, $W_1$ extend parallel to the orientation axis 193 (FIG. 1) and the lateral axis 192 (FIG. 1), respectively, and perpendicular to the mating axis 191 (FIG. 1). In some embodiments, the first dimension $H_2$ is at least three times the second dimension $W_1$. In more particular embodiments, the first dimension $H_2$ is at least five times the second dimension $W_1$.

Figure 11:
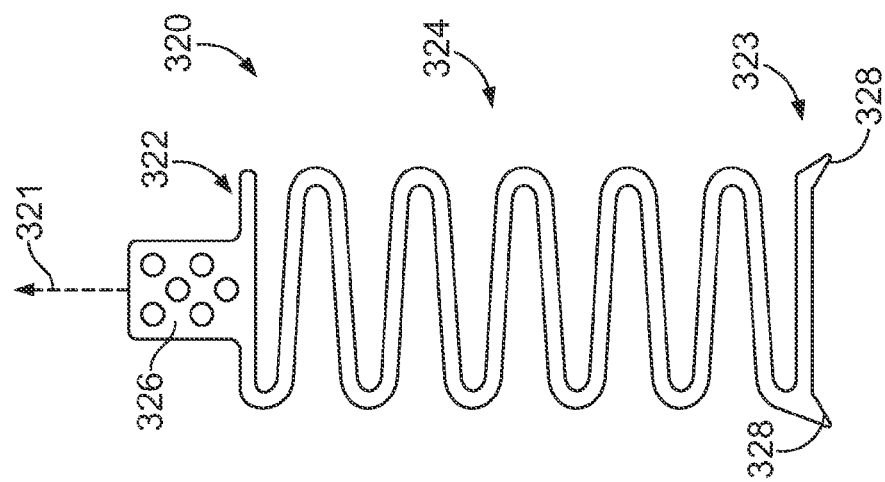
FIG. 11 is a plan view of a biasing element formed in accordance with one embodiment.
Figure 10:
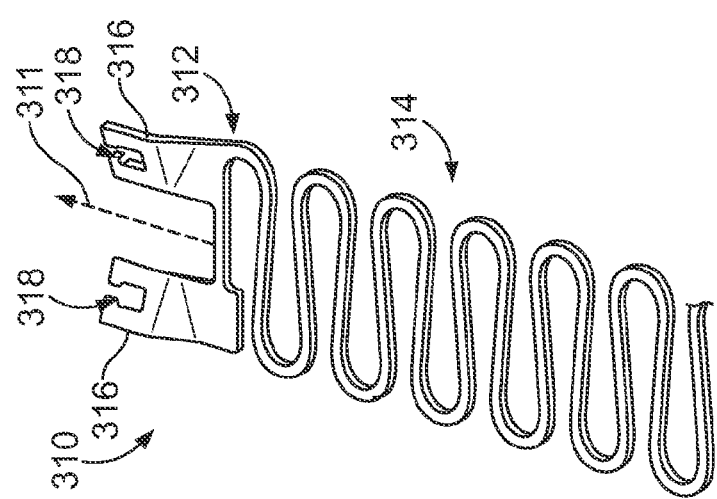
FIG. 10 is a perspective view of a portion of a biasing element formed in accordance with one embodiment.
Figure 9:
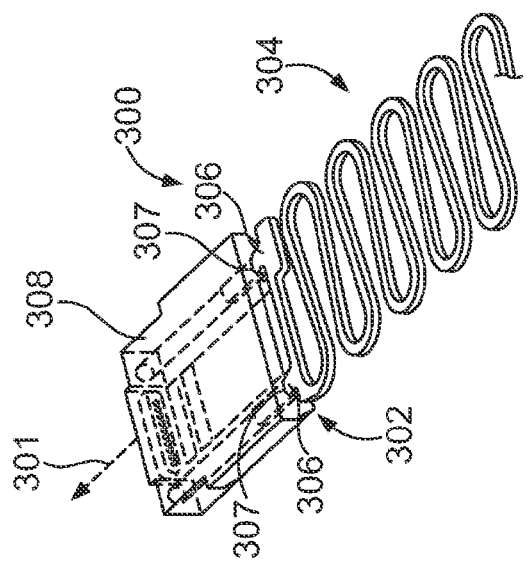
FIG. 9 is a perspective view of a portion of a biasing element formed in accordance with one embodiment.

FIGS. 9-11 show perspective views of biasing elements 300, 310, and 320, respectively, illustrating different grip components among other things. The biasing elements 300, 310, and 320 may replace the biasing element 200 (FIG. 4) and be used with the communication connector 104 (FIG. 1). As shown in FIG. 9, the biasing element 300 includes a module end 302 engaged with an optical module 308 and a spring portion 304. The spring portion 304 may be similar to the spring portion 206 (FIG. 4) and the optical module 308 may be similar to the optical module 130 (FIG. 1). The biasing element 300 may have a back end (not shown) that is similar to the back end 204 (FIG. 4). The module end 302 includes grip components 306 that project along a longitudinal axis 301 of the biasing element 300 and are configured to be inserted into corresponding holes 307 of the optical module 308. The grip components 306 may form an interference fit with the optical module 308 thereby coupling the biasing element 300 and the optical module 308. The grip components 306 may be posts or projections that extend in a linear manner away from the module end 302 along the longitudinal axis 301.

As shown in FIG. 10, the biasing element 310 includes a module end 312 and a spring portion 314. The back end is not shown. The module end 312 may include grip components 316 that extend along a longitudinal axis 311. In an exemplary embodiment, the grip components 316 are tabs that have a partially twisted contour. The tabs may include notches 318 that are configured to receive features (not shown) of an optical module (not shown) and grip the feature thereby coupling the biasing element 310 and the optical module.

As shown in FIG. 11, the biasing element 320 includes a module end 322, a back end 323, and a spring portion 324 extending therebetween. The module end 322 may include a single grip component 326 that extends along a longitudinal axis 321. In an exemplary embodiment, the grip component 326 is a tab having one or more holes extending therethrough. The grip component 326 is configured to be received by a recess (not shown) of an optical module (not shown) and form an interference fit therewith. Also shown in FIG. 11, the back end 323 may include respective projections 328. The projections 328 may be configured to engage a surface of a connector housing (not shown).

Figure 12:
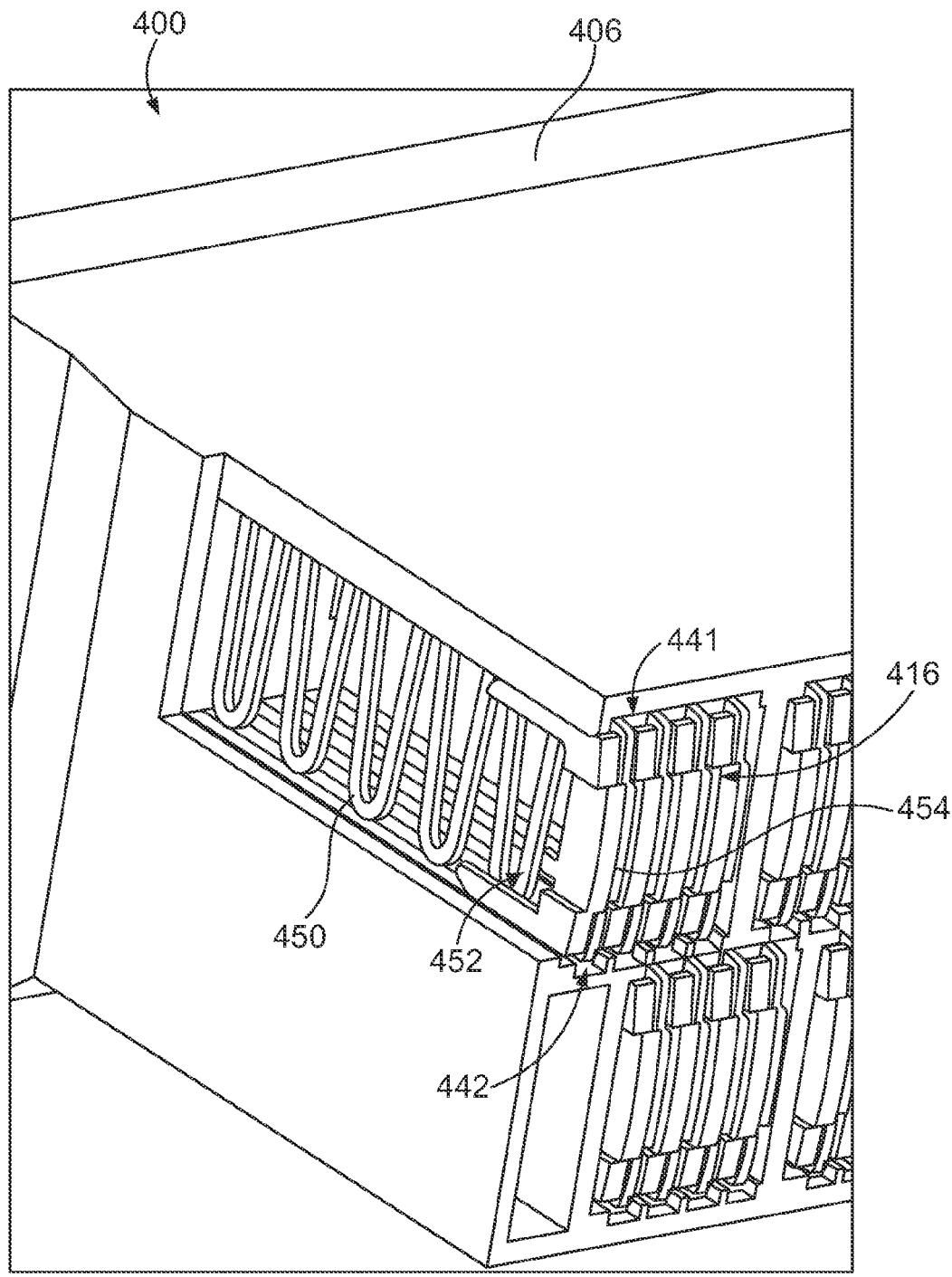
FIG. 12 is a rear perspective view of a communication connector formed in accordance with one embodiment.

FIG. 12 is a rear perspective view of a communication connector 400 formed in accordance with one embodiment. The communication connector 400 may have similar features as the communication connector 104 (FIG. 1). The communication connector 400 includes a connector housing 406 having one or more housing cavities 416 that include guide channels 441, 442. Also shown, the communication connector 400 includes a biasing element 450 having a back end 452 coupled to an element holder 454. As described above, the back end 204 (FIG. 4) of the biasing element 200 (FIG. 4) is configured to engage a surface of the connector housing 106 (FIG. 1). However, in the illustrated embodiment of FIG. 12, the biasing element 450 is received by the element holder 454. The element holder 454 is received between the guide channels 441 and 442 and engaged to the connector housing 406.

Figure 14:
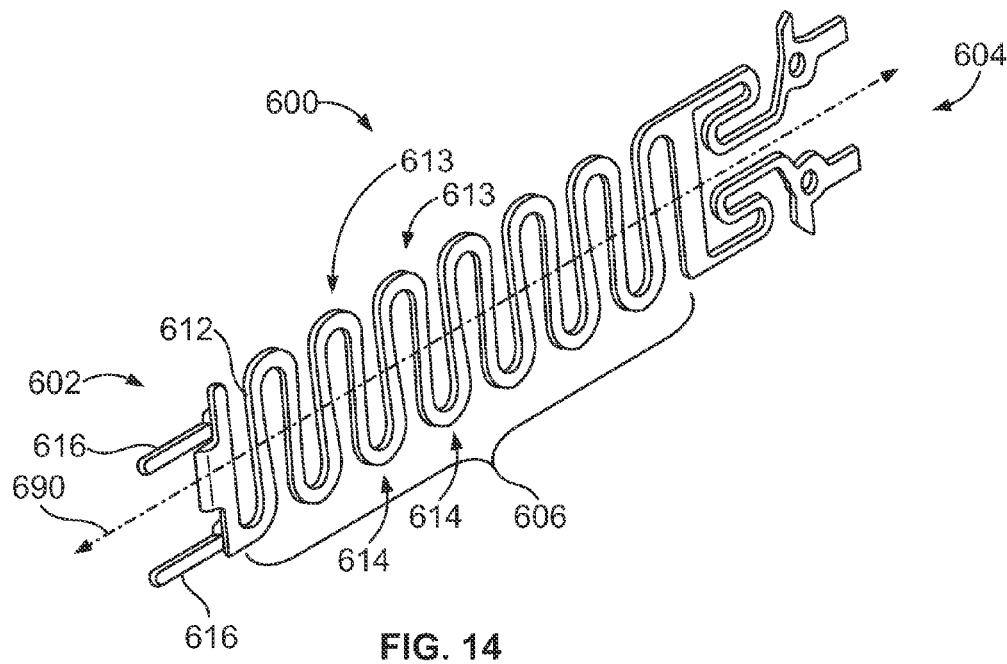
FIG. 14 is a perspective view of a biasing element formed in accordance with one embodiment.

FIG. 14 is an isolated view of a biasing element 600 formed in accordance with one embodiment. The biasing element 600 may be similar to and/or include features similar to those shown and described above with respect to the biasing elements 200 (FIG. 4), 300 (FIG. 9), 310 (FIG. 10), and 320 (FIG. 11). In some cases, the biasing element 600 may replace one of the other biasing elements 200, 300, 310, and 320 and be used with the communication connector 104 (FIG. 1). As shown in FIG. 14, the biasing element 600 includes a module end 602, a back end 604, and a resilient spring portion 606 that extends between the module and back ends 602, 604. The biasing element 600 is configured to be inserted into a corresponding housing cavity (not shown) of a connector housing (not shown) that can be similar to the housing cavity 116 (FIG. 2) and the connector housing 106 (FIG. 1). The biasing element 600 can engage a corresponding optical module (not shown) similar to the optical module 130 (FIG. 1) or the optical module 308 (FIG. 9).

In an exemplary embodiment, the spring portion 606 includes a coil-less spring that allows the biasing element 600 to be compressed between first and second states. The biasing element 600 may have similar dimensions (e.g., length, height, width) and similar dimension ratios as described above with respect to the biasing element 200. The module end 602 is configured to engage the optical module through one or more grip components 616. However, in alternative embodiments, the module end 602 may abut the optical module without coupling to the optical module. The back end 604 may be configured to engage a surface of the connector housing.

The spring portion 606 includes an elongated body 612 having a plurality of flexible bend segments 613, 614. The spring portion 606 may be a coil-less spring. The bend segments 613, 614 may wrap back-and-forth within a spring plane $P_{S2}$ (FIG. 16) in a similar manner as described above with respect to the spring plane $P_{S1}$ (FIG. 4). In some embodiments, the bend segments 613, 614 may intersect (e.g., lie within) the spring plane $P_{S2}$ for an entire path of the corresponding bend segment. In particular embodiments, the entire path of the elongated body 612 extends within the spring plane $P_{S2}$. As shown, the elongated body 612 includes six bend segments 613 and six bend segments 614. However, the elongated body 612 can include fewer bend segments 613, 614 or more bend segments 613, 614. Similar to the biasing element 200, the bend segments 613, 614 include respective linking portions that join a respective pair of arms.

The spring portion 606 extends between the module and back ends 602, 604 along a central longitudinal axis 690. The longitudinal axis 690 can coincide with the spring plane $P_{S2}$. In an exemplary embodiment, the module and the back ends 602, 604 also lie within the spring plane $P_{S2}$. The elongated body 612 may have a path in which portions of the path extend substantially transverse to the longitudinal axis 690 and other portions extend substantially parallel to the longitudinal axis 690. In particular embodiments, the path may be wave-like or serpentine-like between the module and the back ends 602, 604. The path may cross the longitudinal axis 690 a plurality of times (e.g., at least three or four times). The path of the elongated body 612 along the bend segments 613, 614 may also be similar to the bend segments 213, 214 described above. For example, the bend segments 613, 614 may also have a sinusoidal-like waveform in which each of the bend segments 613, 614 has an identical shape. However, in alternative embodiments, the bend segments 613, 614 may have different shapes. In the illustrated embodiment, the biasing element 600 is stamped from a sheet of resilient material but may be manufactured by other processes.

Figure 15:
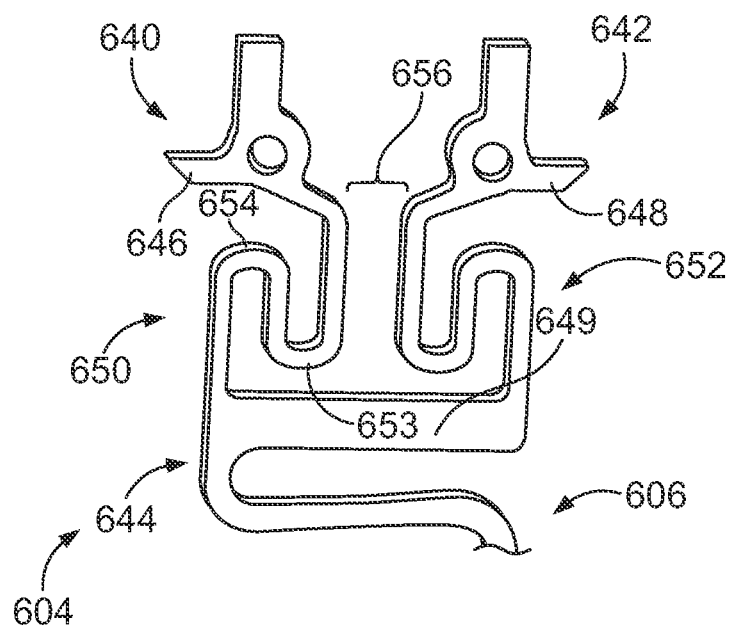
FIG. 15 is a perspective view of an end portion of the biasing element of FIG. 14.

FIG. 15 illustrates the back end 604 in greater detail. The back end 604 is configured to releasably engage the connector housing (not shown). For example, the back end 604 includes first and second legs 640, 642. In an exemplary embodiment, the first and second legs 640, 642 are coupled to a common base beam 649. The base beam 649, in turn, is coupled to the spring portion 606 at an end joint 644. As shown, the first and second legs 640, 642 include respective projections 646, 648. The projections 646, 648 extend lengthwise away from the longitudinal axis 690. Like the projections 246, 248 shown in FIG. 6, the projections 646, 648 may be configured to engage corresponding surfaces of the connector housing when the biasing element 600 is held within the housing cavity.

In an exemplary embodiment, each of the first and second legs 640, 642 is configured to move with respect to the connector housing (or the base beam 649) to at least one of engage the connector housing or release the biasing element 600 from the connector housing. The first and second legs 640, 642 can include respective flex portions 650, 652. Each of the flex portions 650, 652 includes bend segments 653, 654 that form an S-shaped structure. The bend segments 653, 654 can be similar to the bend segments 613, 614 and permit the projections 646, 648 to move away from the corresponding surfaces of the connector housing that the projections 646, 648 engage when the biasing element 600 is held within the housing cavity. By way of one example, the first and second legs 640, 642 may be gripped by an individual or machine and moved toward each other (or toward the longitudinal axis 690). As shown, the flex portions 650, 652 are separated by a spacing 656. In some embodiments, the spacing 656 may reduce until the flex portions 650, 652 engage each other thereby preventing further movement of the flex portions 650, 652 toward the longitudinal axis 690.

Figure 16:
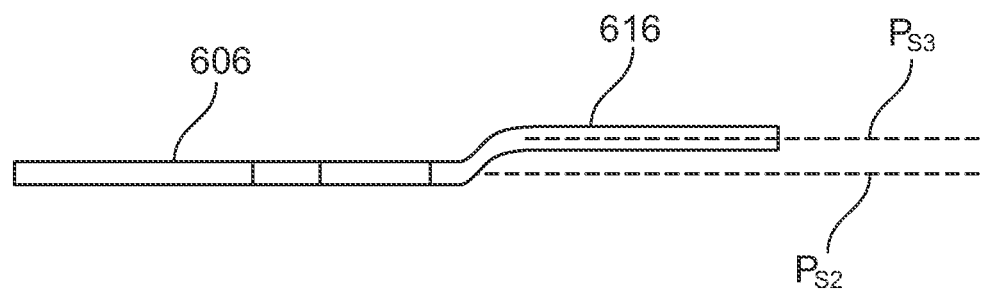
FIG. 16 is a side view of the end portion shown in FIG. 15.

FIG. 16 is a side view of the module 602. In some embodiments, the spring portion 606 extends along the spring plane $P_{S2}$ and the grip components 616 can extend outside of the spring plane $P_{S2}$. In an exemplary embodiment, the grip components 616 may extend out of the spring plane $P_{S2}$ and then extend along a spring plane $P_{S3}$. The spring plane $P_{S3}$ extends parallel to the spring plane $P_{S2}$ in the illustrated embodiment.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the subject matter described and/or illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An optical communication connector comprising:
    a connector housing including opposite mating and loading sides and a housing cavity that extends therebetween;
    an optical module positioned within the housing cavity, the optical module having a mating face that faces an exterior of the connector housing along the mating side and is configured to engage an optical connector during a mating operation; and
    a biasing element positioned between the optical module and the loading side in the housing cavity, the biasing element having a module end, a back end, and a resilient spring portion that extends between the module and back ends, the spring portion including an elongated body having a plurality of flexible bend segments that wrap back-and-forth within a spring plane, wherein the spring portion is compressible between first and second states during the mating operation between the optical module and the optical connector, the spring portion permitting the optical module to slide toward the loading side during the mating operation wherein the mating face includes an array of apertures, each aperture including an optical fiber therein or configured to receive an optical fiber during the mating operation, the spring plane extending through the array of apertures.

2. The optical communication connector of claim 1, wherein the biasing element includes biasing components that are stacked directly side-by-side and coupled together so that the stacked biasing components move with each other between the first and second states.

3. The optical communication connector of claim 1, wherein the elongated body extends along a path, the path curving more than 180° through at least one of the bend segments.

4. The optical communication connector of claim 1, wherein the biasing element has a longitudinal axis that extends between the module and back ends, the spring portion including at least seven flexible bend segments, each of the flexible bend segments including adjacent arms and a linking portion, the adjacent arms extending transverse to the longitudinal axis.

5. The optical communication connector of claim 1, wherein the biasing element is stamped from sheet material.

6. The optical communication connector of claim 1, wherein the module and back ends extend within the spring plane.

7. The optical communication connector of claim 1, wherein the optical communication connector includes a plurality of said optical modules and a plurality of said biasing elements, the biasing elements positioned between respective optical modules and the loading side.

8. The optical communication connector of claim 7, wherein at least two of the optical modules are stacked adjacent to each other such that (a) an empty space exists between the adjacent optical modules or (b) the adjacent optical modules directly contact each other, the adjacent optical modules being slidable alongside each other.

9. An optical communication connector comprising:
    a connector housing including opposite mating and loading sides and a mating axis that extends therebetween, the connector housing having a housing cavity, the connector housing including a pair of opposing walls that define the housing cavity therebetween;
    a plurality of optical modules positioned within the housing cavity, at least two of the optical modules being stacked adjacent to each other such that the adjacent optical modules directly contact each other, the adjacent optical modules being slidable alongside each other, the walls holding the adjacent optical modules therebetween within the housing cavity; and a plurality of biasing elements positioned between respective optical modules and the loading side in the housing cavity, each of the biasing elements including a coil-less spring portion that is compressible between first and second states during a mating operation thereby permitting the optical modules to slide toward the loading side, the optical modules sliding along the walls during the mating operation.

10. The optical communication connector of claim 9, wherein said at least two optical modules have respective mating faces, the mating faces having first and second dimensions that extend perpendicular to the mating axis, the first dimension being at least five times the second dimension.

11. The optical communication connector of claim 9, wherein at least one of the biasing elements includes biasing components that are stacked side-by-side and coupled together so that the stacked biasing components move with each other between the first and second states.

12. The optical communication connector of claim 9, wherein said at least two optical modules are engaged with different respective biasing elements and movable within different operational envelopes of the housing cavity that are adjacent to each other, each of the respective biasing elements being located within and moving along the corresponding operational envelope without intersecting the other adjacent operational envelope.

13. The optical communication connector of claim 9, wherein each of the plurality of biasing elements has a module end and a back end, the spring portion extending between the module and back ends and including an elongated body having a plurality of flexible bend segments that wrap back-and-forth within a spring plane.

14. An optical communication connector comprising:

a connector housing including opposite mating and loading sides and a mating axis that extends therebetween, the connector housing having a housing cavity, the connector housing including a pair of opposing walls that define the housing cavity therebetween;

an optical module positioned within the housing cavity, the optical module having a mating face that faces an exterior of the connector housing along the mating side and is configured to engage an optical connector during a mating operation, the optical module being movable along the mating axis, the walls holding the optical module therebetween within the housing cavity; and a biasing element positioned between the optical module and the loading side in the housing cavity, the biasing element including a module end, a back end, and a coil-less spring portion that extends between the module end and the back end, the module end directly engaging the optical module, wherein the coil-less spring portion is compressible between first and second states during the mating operation between the optical module and the optical connector to permit movement of the optical module toward the loading side, the optical module sliding along the walls during the mating operation.

15. The optical communication connector of claim 14, wherein the biasing element includes biasing components that are stacked side-by-side and coupled together so that the stacked biasing components move with each other between the first and second states.

16. The optical communication connector of claim 14, wherein the optical communication connector includes a plurality of said optical modules and a plurality of said biasing elements, the biasing elements positioned between respective optical modules and the loading side, wherein at least two of the optical modules are adjacent to each other, such that (a) an empty space exists between the adjacent optical modules or (b) the adjacent optical modules directly contact each other, the adjacent optical modules being slidable alongside each other.

17. The optical communication connector of claim 1, wherein the mating face is positioned proximate to the mating side of the connector housing.

18. The optical communication connector of claim 17, wherein the connector housing includes a positive stop that is located proximate to the mating side, the optical module engaging the positive stop when the spring portion is in the first state, wherein the positive stop and the spring portion in the first state hold the optical module in a designated position for engaging the optical connector.

19. The optical communication connector of claim 1, wherein the optical module includes at least one alignment pin, at least one alignment bore, or a combination thereof along the mating face.

20. The optical communication connector of claim 9, wherein each of the spring portions includes an elongated body having a plurality of flexible bend segments that wrap back-and-forth within a spring plane, and wherein each of the optical modules has a mating face that includes an array of apertures in which each aperture includes an optical fiber therein or is configured to receive an optical fiber during the mating operation, the spring plane extending through the array of apertures of the corresponding optical module.

* * * * *